United States Patent
McLean

(10) Patent No.: US 8,272,401 B2
(45) Date of Patent: Sep. 25, 2012

(54) COMPACT PRESSURE BALANCED ROTARY VALVE

(75) Inventor: Christopher R. McLean, British Columbia (CA)

(73) Assignee: Air Products and Chemicals, Inc., Allentown, PA (US)

( * ) Notice: Subject to any disclaimer, the term of this patent is extended or adjusted under 35 U.S.C. 154(b) by 512 days.

(21) Appl. No.: 12/554,535

(22) Filed: Sep. 4, 2009

(65) Prior Publication Data

US 2010/0059701 A1    Mar. 11, 2010

Related U.S. Application Data

(60) Provisional application No. 61/095,407, filed on Sep. 9, 2008.

(51) Int. Cl.
*F16K 11/06* (2006.01)
(52) U.S. Cl. .................. 137/625.11; 251/172; 251/174
(58) Field of Classification Search ............ 137/625.11, 137/625.15, 625.16, 625.43, 625.46; 251/172, 251/174
See application file for complete search history.

(56) References Cited

U.S. PATENT DOCUMENTS

| | | | | |
|---|---|---|---|---|
| 2,827,924 A * | 3/1958 | Towler et al. | ............ | 137/625.11 |
| 2,925,095 A * | 2/1960 | Bates | ................. | 137/625.43 |
| 2,979,963 A * | 4/1961 | Snoy | ................. | 74/364 |
| 3,246,667 A * | 4/1966 | Pemberton | ............ | 137/312 |
| 3,537,680 A * | 11/1970 | Zajac | ............. | 251/172 |
| 3,687,163 A * | 8/1972 | Nickels | ............ | 137/625.11 |
| 4,632,148 A * | 12/1986 | Stark et al. | ............ | 137/624.18 |
| 5,520,216 A * | 5/1996 | d'Agostino et al. | ...... | 137/624.13 |
| 5,704,396 A * | 1/1998 | Brillant et al. | ............ | 137/625.15 |

* cited by examiner

*Primary Examiner* — John Fox
(74) *Attorney, Agent, or Firm* — Eric J. Schaal

(57) ABSTRACT

A pressure balanced rotary valve can be made more compact if the ports on the stator within can be located on a port pitch circle of smaller diameter. In certain circumstances for rotary valves used in pressure swing adsorption devices, it is acceptable for the spacing between the ports to be made smaller than the ports themselves. In a rotary valve comprising variable loading means (e.g. pistons) and fixed loading means (e.g. springs), this can involve reducing the piston size and increasing the load provided by the springs.

20 Claims, 4 Drawing Sheets

COMPACT PRESSURE BALANCED ROTARY VALVE

CROSS REFERENCE TO RELATED APPLICATION

This application claims the benefit of the earlier filing date of U.S. Provisional Application No. 61/095,407, which was filed on Sep. 9, 2008. The entire disclosure of the provisional application is considered to be part of the disclosure of the following application and is hereby incorporated by reference.

FIELD

The present disclosure concerns pressure balanced rotary valves, particularly for use in pressure swing devices.

BACKGROUND

Rotary valves can provide a convenient and compact way of consolidating the multiple valves required for repetitive chemical processing cycles into a single, simple unit. For instance, rotary valves can be particularly useful in chemical processing operations involving pressure swing devices (e.g. pressure swing adsorption devices, pressure swing reforming devices).

In general, rotary valves comprise a stator and a rotor that is rotated about its axis relative to the stator. Both stator and rotor contain suitably sized and located ports that function as multiple valves as a result of the rotation of the rotor. Via this rotation, the ports in the rotor come into and out of alignment with ports in the stator, thus opening and closing the ports to fluid flow, and thereby serving as valves. Some means of loading is required to engage the rotor with the stator in order to maintain an adequate seal therebetween. In some applications, a uniform, constant load may provide satisfactory function of the rotary valve.

However, in pressure swing applications, the fluid pressure present at one port in the valve may be vastly different from the pressure at another location in the valve (e.g. the pressure may vary by tens of atmospheres). Such an imbalance cannot be readily accommodated with the use of a uniform, constant sealing load. And, in order to maintain a satisfactory seal in a region of high fluid pressure, a correspondingly large sealing load must be applied there to counteract the pressure forcing the stator and rotor apart. However, in regions of relatively low fluid pressure, the same large sealing load would result in great friction between stator and rotor and hence increased heating, wear, and torque requirement for the motor driving the rotor. In these pressure swing applications then, it is thus preferred to employ pressure balanced rotary valves in which variable loading pressures are employed at the various port locations such that higher sealing or closing loads are provided in regions of high pressure and lower sealing/closing loads are provided in regions of low pressure.

A particularly suitable pressure balanced rotary valve for use in pressure swing devices is disclosed in U.S. Reissue Pat. No. 38493. Therein, the rotary valve comprises axially aligned fluid transfer sleeves (e.g. pistons) which are used to provide a variable load to keep the stator and rotor closed. Mechanical springs may be employed to provide a minimum fixed load to keep the stator and rotor closed. In particular, the fluid transfer sleeves may be located in cylinders formed in the stator at the various locations of the stator ports. The sleeves may be sealed to the cylinders using static seals or piston rings. Each adsorbent bed in the pressure swing device is connected to one of these ports and thus the fluid pressure in the fluid transfer sleeve is provided by that adsorbent bed fluidly connected to it. A variable load is thus provided at each port in the stator and this load is a function of the pressure in the adsorbent bed and of the axial area of the fluid transfer sleeve. In U.S. Pat. No. 38,493, mechanical springs provide a fixed load to the stator via the fluid transfer sleeves (e.g. springs are located beneath the fluid transfer sleeves and assist the sleeves to urge the stator against the rotor).

Commercial pressure swing adsorption devices employing such pressure balanced rotary valves have been available for many years now (e.g. H3200 series PSA devices of Xebec Adsorption Inc., formerly Questair Technologies Inc.). In these commercial devices, the mechanical springs in the fluid transfer sleeves are generally selected to apply a sufficient fixed load to obtain a satisfactory seal on startup of the device. Otherwise though, the fixed load is generally set to be low as possible to keep friction heating, wear, and torque to a minimum.

In rotary valves of this kind, the ports in both stator and rotor may be located on a port pitch circle that is centered on the rotor axis. In typical commercial applications, the operating parameters required of the device (e.g. flow rates, pressures, and the like), combined with the preference for keeping the fixed load as low as possible, generally result in a relatively large fluid transfer sleeve or piston size being employed. Because these pistons are also located on, or close to, the ports, the relatively large piston size typically limits the minimum port pitch circle that can be used. As a consequence, the relatively smaller stator ports wind up spaced apart such that the spacings between stator ports are greater than the size of the ports themselves.

In addition, the typical rotary valve pressure swing adsorption device employs two rotary valves, one connected to the feed ends of the adsorbent beds where the gas mixtures to be separated are provided, and another connected to the product ends of the adsorbent beds where separated product gases are obtained. The port geometries in the stators and rotors (i.e. size, shape, and spacing) are typically chosen to optimize the process cycle for a given gas separation application. However, this too would generally include choosing a design in which the port spacings on the stator are greater in size than the ports themselves. On the product end of the device, this has been an essential requirement. This is because the ports in the rotor (which are typically as big or bigger than those in the stator) would otherwise interconnect adjacent stator ports over portions of the rotation cycle and thus cause an unacceptable bridging of gases between these adjacent stator ports.

In a given chemical processing application, if greater processing throughput is desired, the rotary valves must be designed to handle greater gas flows and hence employ larger ports. Conventionally, this means the rotary valve diameter would be increased accordingly to accommodate the greater port size. Also, the size of the fluid transfer sleeves or pistons must be increased accordingly to provide a greater possible variable load for pressure balancing purposes.

SUMMARY

It has been realized that in certain applications employing rotary valves, it is acceptable to employ stator port spacings that are less than the port size and still maintain acceptable process cycle function and an acceptable loading between the rotor and stator. For instance, on the feed end of a pressure swing adsorption device, it can be acceptable practice to have two adjacent stator ports interconnected at certain times in the process cycle. Thus, in this application, the stator port spacing may be reduced such that some bridging of gases occurs here during the process cycle. That is, the spacings between ports in the rotary valve may be made less than the size of the ports themselves. Further, although it results in somewhat of an increase in friction related heating and wear, it can be acceptable to reduce the size of the variable pressure balancing sleeves or pistons, and hence the variable load they provide, while increasing the mechanically provided fixed load to compensate. Thus, the piston size no longer need dictate the minimum port pitch circle that is used. With these two limitations relaxed, it is possible to increase the port size and hence the throughput of a rotary valve without a conventional increase in the overall size of the valve.

Such a compact rotary valve comprises a stator comprising at least two ports centred on a port pitch circle, in which each port provides an opening over an open arc length around the port pitch circle and thereby defines port spacings between the ports over closed arc lengths around the port pitch circle. The compact rotary valve also comprises a rotor rotating about a rotor axis at the centre of the port pitch circle and comprising at least two ports centred on the port pitch circle, variable loading means to sealingly engage the rotor to the stator, fixed loading means to sealingly engage the rotor to the stator, and drive means to rotate the rotor about the rotor axis relative to the stator such that the ports in the rotor come into and out of alignment with the ports in the stator. The compact rotary valve is characterized in that the minimum closed arc length of a port spacing in the stator is less than the maximum open arc length of a port opening.

The stator may typically comprise a plurality of ports. A variety of port shapes may be employed but, in particular the stator ports may be circular. Various port sizes may also be employed, but in particular the stator ports may be essentially the same size. Further, the stator ports may be spaced equidistant around the port pitch circle in which case, all the closed arc lengths of the port spacings are essentially equal and all the open arc lengths of the ports are essentially equal. Also, in this instance, the closed arc length of all the port spacings will be less than the open arc length of all the port openings.

The variable loading means employed in the rotary valve can comprise pistons located adjacent each port in the stator in order to provide a variable load to the stator in accordance with gas pressure received at that port. These pistons may be centred on the port pitch circle.

The fixed loading means in the rotary valve can comprise springs to provide a fixed load to the stator. The springs can be located outside the pistons. In one embodiment, there may be two sets of springs, a first set located on a first spring pitch circle larger than the port pitch circle, and a second set is located on a second spring pitch circle smaller than the port pitch circle. For improved balancing, the force provided by the second set of springs may be chosen to be less than that applied by the first set of springs. This can be accomplished by selecting springs in which the spring constant of the second set of springs is smaller than that of the first set of springs.

The rotary valve is suitable for use in a rotary pressure swing device such as a pressure swing adsorption (PSA) device, and particularly at the feed end. The adsorbent beds in the PSA device generally are the sources of gas pressure received at the ports in the stator. As mentioned above, it can be acceptable to reduce the size of the variable pressure balancing pistons, while increasing the mechanically provided fixed load to compensate. For instance, in a rotary PSA device, the variable and fixed pressures (or forces) may be modified such that the average contact pressure between the rotor and the stator during operation is greater than 59 psi, and/or such that the springs provide more than 10% of the total loading force applied to the stator by the pistons and springs. (Contact pressure is the net local pressure of the two surfaces in contact.)

The invention thus represents a method of reducing the size of a rotary valve in a pressure swing device (e.g. a PSA device). The method comprises decreasing the port pitch circle diameter such that the minimum closed arc length of a stator port spacing is less than the maximum open arc length of a stator port opening and thereby accepting the result that there is a bridging of the ports during at least a portion of the pressure swing adsorption cycle. Further, the method can comprise reducing the size of the pistons and increasing the load provided by the springs such that the average contact pressure between the rotor and the stator during operation is increased above 59 psi, and/or such that the springs provide more than 10% of the total loading force to the stator.

The foregoing and other objects, features, and advantages of the invention will become more apparent from the following detailed description, which proceeds with reference to the accompanying figures.

DETAILED DESCRIPTION

Unless expressly defined otherwise, all technical and scientific terms used herein have the same meaning as commonly understood by a person of ordinary skill in the art to which this disclosure belongs. The singular terms "a," "an," and "the" include plural referents unless the context clearly indicates otherwise. Similarly, the word "or" is intended to include "and" unless the context clearly indicates otherwise.

The term "includes" means "comprises."

In the case of conflict, the present specification, including explanations of terms, will control.

The materials, methods, and examples described herein are intended to be illustrative only and are not intended to limit the invention to the specific materials, methods and examples disclosed.

Figure 1:
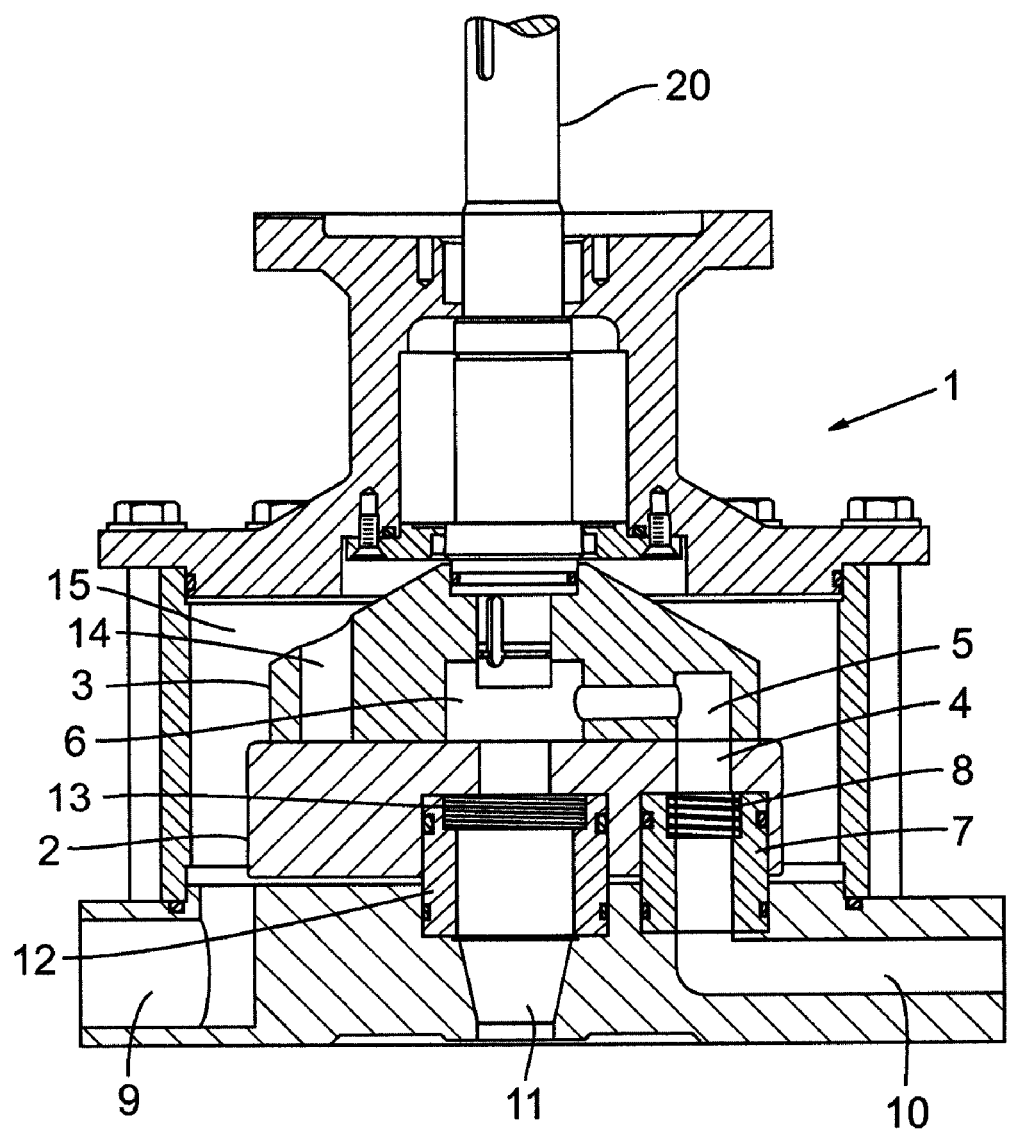
FIG. 1 is a cross section of a feed end of a prior art PSA device in commercial use which comprises a rotary valve.

The feed end of a prior art PSA device employing three equalization steps in the process cycle and comprising a pressure balanced rotary valve is shown in the cross section of FIG. 1. As shown, feed end rotary valve 1 includes stator 2 and rotor 3 which each comprise several ports centred on stator and rotor pitch circles respectively. Although not visible in FIG. 1, stator 2 comprises nine circular ports spaced equidistant around the stator port pitch circle (i.e. 40 degrees apart). Each of these ports then fluidly connects to the feed end of one of nine corresponding adsorbent beds in the PSA device. One stator port 4 is shown in FIG. 1, which fluidly connects via conduit 10 (formed in stator 1) to the feed end of an adsorbent bed (not shown). Rotor 3 comprises two oblong function ports spaced approximately 180 degrees apart on the rotor port pitch circle. One port is used to supply feed gas to more than one adsorbent bed at a time, while the other is used to exhaust blowdown gas from more than one adsorbent bed at a time during the PSA cycle. Feed gas rotor port 5 is shown in FIG. 1 and fluidly connects to the feed gas supply (not shown) via conduit 6 in rotor 3 and via conduit 11 formed in stator 2. The other blowdown rotor port 14 is fluidly connected to the volume 15 surrounding rotor 3, which in turn is fluidly connected to conduit 9 for blowdown exhaust. Stator port 4 and rotor port 5 are aligned in FIG. 1 and thus feed gas would be being supplied to that adsorbent bed connected to conduit 10.

Rotary valve 1 additionally comprises variable loading means for pressure balancing purposes. This is provided by pistons 7 which are located adjacent the stator ports and which force stator 2 towards rotor 3 in accordance with the fluid pressure inside the piston (e.g. the gas pressure in conduit 10 for piston 7 illustrated in FIG. 1). Rotary valve 1 also comprises fixed loading means which are provided in part by mechanical springs 8 which are seated within pistons 7 in this embodiment. However, fixed loading means are also provided in the embodiment shown at the centre of stator 2 via piston 12 and via mechanical spring 13. The force provided by piston 12 is a function of the feed gas pressure in conduit 11 and thus is fixed if the feed gas pressure is fixed.

In FIG. 1, drive means for rotor 3 is provided by shaft 20, and a drive motor (not shown).

General practice in the prior art is to provide a sufficient fixed load to the stator in order to obtain a satisfactory seal on startup of the device. Beyond that however, the fixed load is kept to a minimum in order to minimize friction heating, wear, and torque. This generally results in a relatively large size being employed for pistons 7 relative to the stator diameter. In turn, this limits the minimum port pitch circle that can be used. As a consequence, the stator ports wind up spaced apart such that the spacings between stator ports are greater than the size of the ports themselves.

Figure 2A:
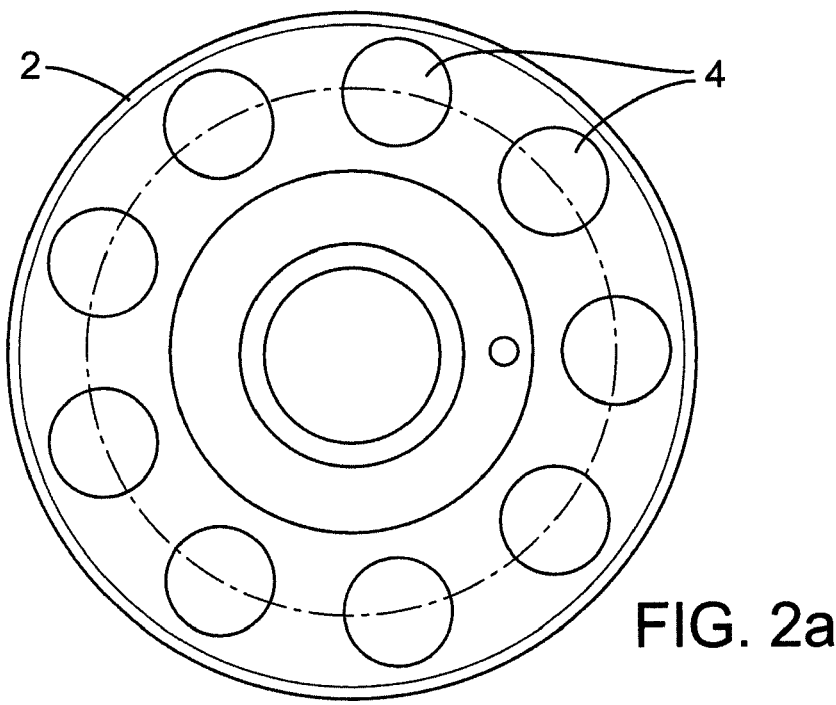
FIGS. 2a and 2b depict plan views of the seal side of the feed stators of an inventive and of a prior art rotary valve respectively.
Figure 2B:
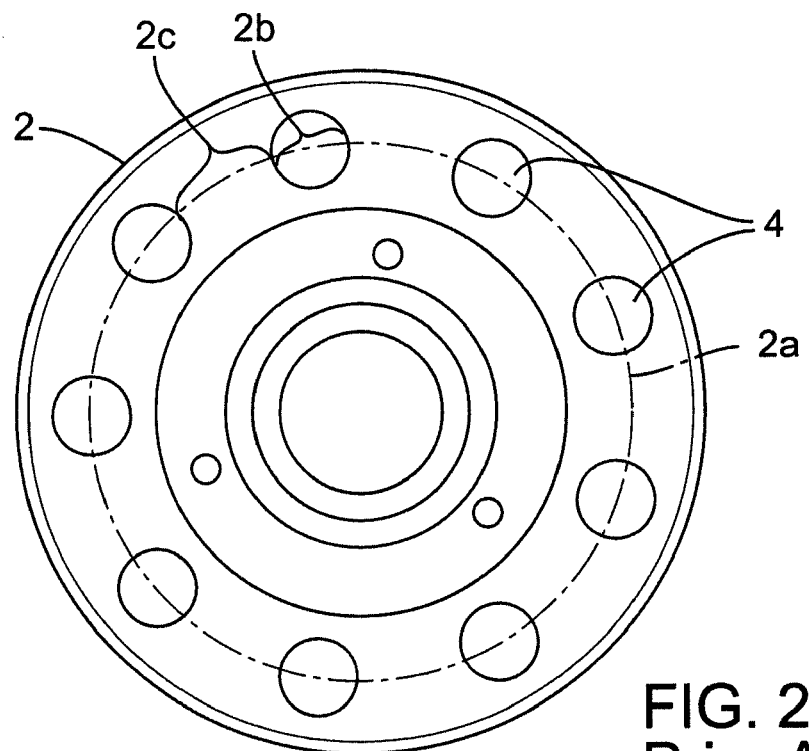
Figure 3A:
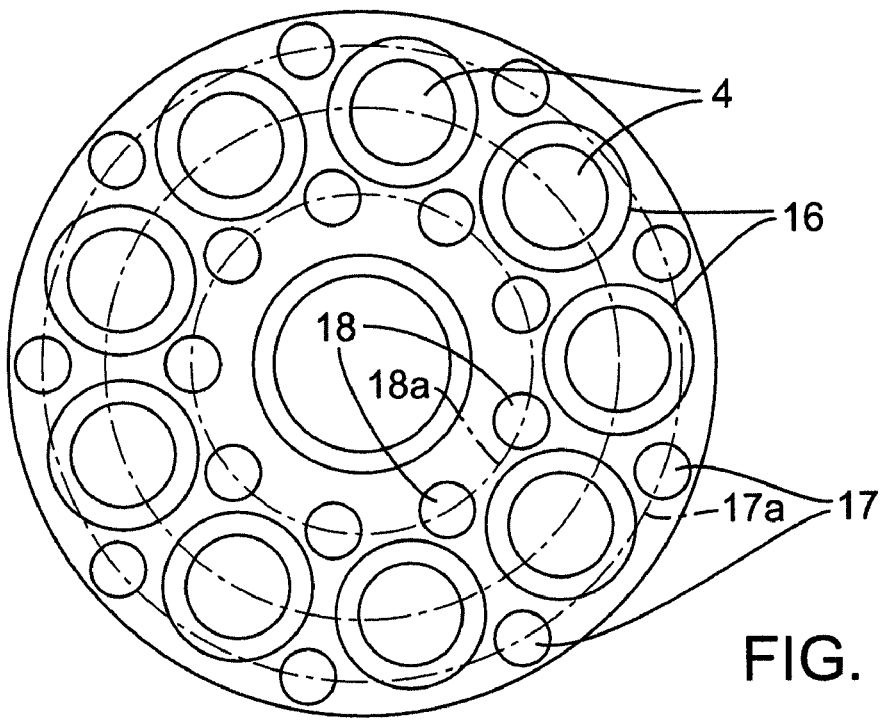
FIGS. 3a and 3b depict plan views of the back side of the feed stators of an inventive and of a prior art rotary valve respectively.
Figure 3B:
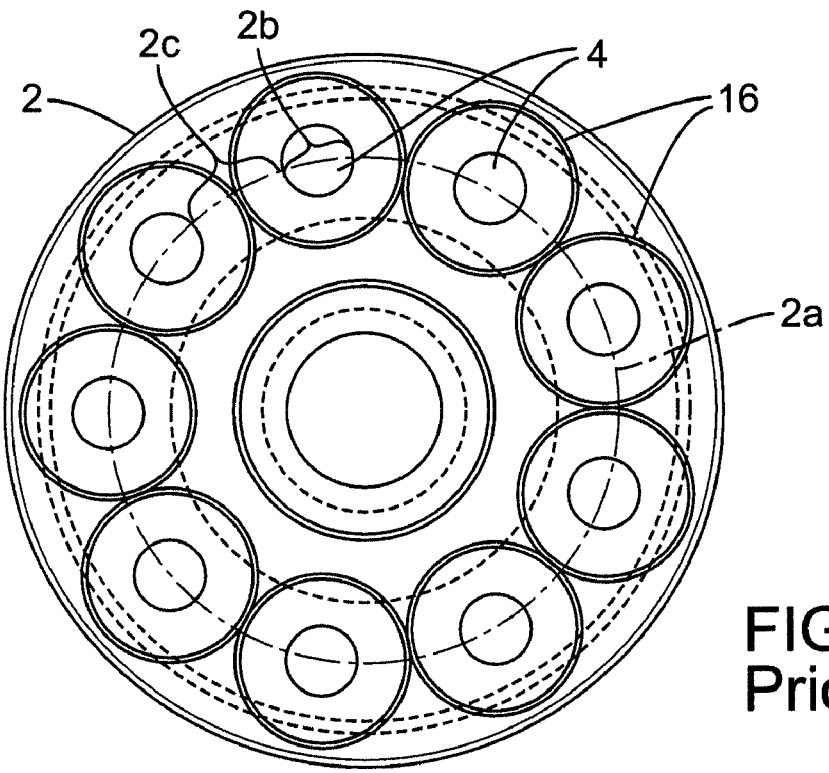

FIGS. 2b and 3b illustrate this situation in plan views of the seal side and the back side respectively of stator 2 in FIG. 1. Ports 4 are centred on and spaced equidistant around stator port pitch circle 2a. The open arc length of a port opening 2b is significantly smaller than the closed arc length of a port spacing 2c. As can be seen from FIG. 3b, this is a consequence of using relatively large pistons which require relatively large sleeves 16 to be formed in stator 2. In this embodiment, piston sleeves 16 (and pistons 7) are also centred on port pitch circle 2a and, as shown in FIG. 3b, are spaced essentially as close as possible already. The overall diameter of stator 2 cannot be reduced. The diameter of port pitch circle 2a can in principle be reduced by offsetting the port centres with respect to those of the pistons, but even then, only to a very small extent.

FIGS. 2a and 3a on the other hand depict plan views of the seal side and back side respectively of a stator for a rotary valve of the invention. (For ease of comparison, like numerals have been employed here for like features to those in FIGS. 1, 2b and 3b.) Here, the size of the variable load pistons 7 has been reduced and hence so has the diameter of sleeves 16. As a result, the fixed force provided has to be relatively increased. However, the benefit is that now either the port pitch circle diameter can be reduced (thus reducing the valve size) or alternatively, the size of ports 4 can be increased (thus increasing the processing capability of the PSA, as is the case shown in FIGS. 2a and 3a). Another benefit is that there is now space available on the stator surface to locate fixed load springs outside of pistons 7. This allows for better pressure balancing. For instance, FIG. 3a shows locations 17 and 18 for first and second sets of springs respectively that are outside of pistons 7. Locations 17 for the first spring set are on a first pitch circle of greater diameter than port pitch circle 2a. Locations 18 for the second spring set are on a second pitch circle of lesser diameter than port pitch circle 2a. The second set of springs applies less closing force to stator 2 than does the first set of springs for better balancing. This can be achieved either by using springs with a smaller spring constant for the second set or alternatively by using shorter springs (and thereby compressing less) for the second set.

As mentioned above, rotary valves of the invention have relatively smaller pistons 7 for a given valve size and thus require relatively more fixed loading to compensate for the reduction in the variable loading provided. The fixed loading means (e.g. springs 8) thus provide more of the conventional total loading force and can, for instance, be providing more than 10% of the total loading force. Also, the average contact pressure between stator 2 and rotor 3 is increased over that of conventional rotary valves. We have found that the satisfactory operation of a rotary valve can still be achieved when the average contact pressure during operation is greater than 59 psi.

The preceding description applied to a rotary valve for a PSA device comprising nine adsorbent beds. Those skilled in the art will appreciate how the invention can be modified to be appropriate for PSA devices employing a different number of adsorbent beds and/or for use in devices other than PSAs. In a like manner to the preceding, stators for such other rotary valve applications may be made in a similar manner as long as some bridging between ports is acceptable and as long as higher total loading and/or average contact pressure is acceptable. Further still, embodiments with different shaped ports or with stator ports and pistons centred on different pitch circles may be contemplated.

The following examples are provided to exemplify particular features of the present invention. A person of ordinary skill in the art will appreciate that the scope of the present invention is not limited to the particular features exemplified by these examples.

EXAMPLES

A series of rotary valves were designed and built for use in rotary PSA devices of varying flow range capability. The table below lists the pertinent mechanical characteristics of these rotary valves. In the table, three different size valves are listed and include comparative valves for the feed sides in both a relatively small PSA and a midsize PSA, and finally an inventive valve for the feed side of the relatively large PSA.

In all cases, the PSAs comprised 9 adsorbent beds. The stator for the inventive feed valve in the large PSA is illustrated in FIGS. 2a and 3a. The stator for the comparative feed valve in the midsize PSA is illustrated in FIGS. 2b and 3b.

In all cases, variable loading to sealingly engage the stator to the rotor is provided by pistons in accordance with the gas pressure in the adsorbent beds. The fixed loading is mainly provided by springs located within these pistons or just outside the pistons as shown in FIGS. 2 and 3. However, some additional fixed force was also provided in some embodiments by a central spring and/or piston as shown in FIG. 1.

| Rotary valve Characteristic | Inventive for feed valve in large PSA | Comparative for feed valve in midsize PSA | Comparative for feed valve in small PSA |
| --- | --- | --- | --- |
| Feed pressure (psig) | 300 | 300 | 175 |
| Stator port diameter (inches) | 2.4 | 0.75 | 0.28 |
| Stator port pitch circle diameter (inches) | 11.8 | 5.3 | 3.4 |
| Stator port arc length (inches) | 2.40 | 0.751 | 0.280 |
| Stator port spacing arc length (inches) | 1.71 | 1.10 | 0.907 |
| (Port diameter)/(port pitch circle diameter) | 20% | 14% | 8% |
| Piston diameter (inches) | 3.5 | 1.8 | 1 |
| # springs in or near pistons | 18 | 9 | 9 |
| Fraction of closing force provided by pistons | 50% | 93% | 63% |
| Fraction of closing force provided by springs | 50% | 7% | 37% |
| Average contact pressure between stator and rotor (psi) | 81 | 59 | 24 |
| (Average contact pressure)/(feed pressure) | 27% | 20% | 14% |

In the inventive feed valve above, the port pitch circle diameter was reduced with respect to the port size such that the stator port spacing arc length was less than the arc length of the port openings. This allows for a smaller overall valve size but requires a smaller piston size (relative to convention) in order to achieve it. In turn, this results in less variable loading capability and thus a requirement for greater fixed loading to compensate.

The ratio of the (port diameter)/(port pitch circle diameter) is indicative of how much the valve has been reduced in size with regards to the port size. The fraction of the closing force provided by each of the pistons and springs is indicative of how much the fixed load has been increased to compensate. In the larger inventive feed valve, the springs now provide more than 10% of the total closing force. (Note that this is also the situation in the smaller valve in the comparative small PSA application as well. However, this % would generally decrease with valve size using prior art design principles.) And, the average contact pressure shows how much the loading between stator and rotor has been increased overall, on average. The inventive feed valve would now operate at an average of 81 psi (significantly >59 psi) in this application.

Figure 4:
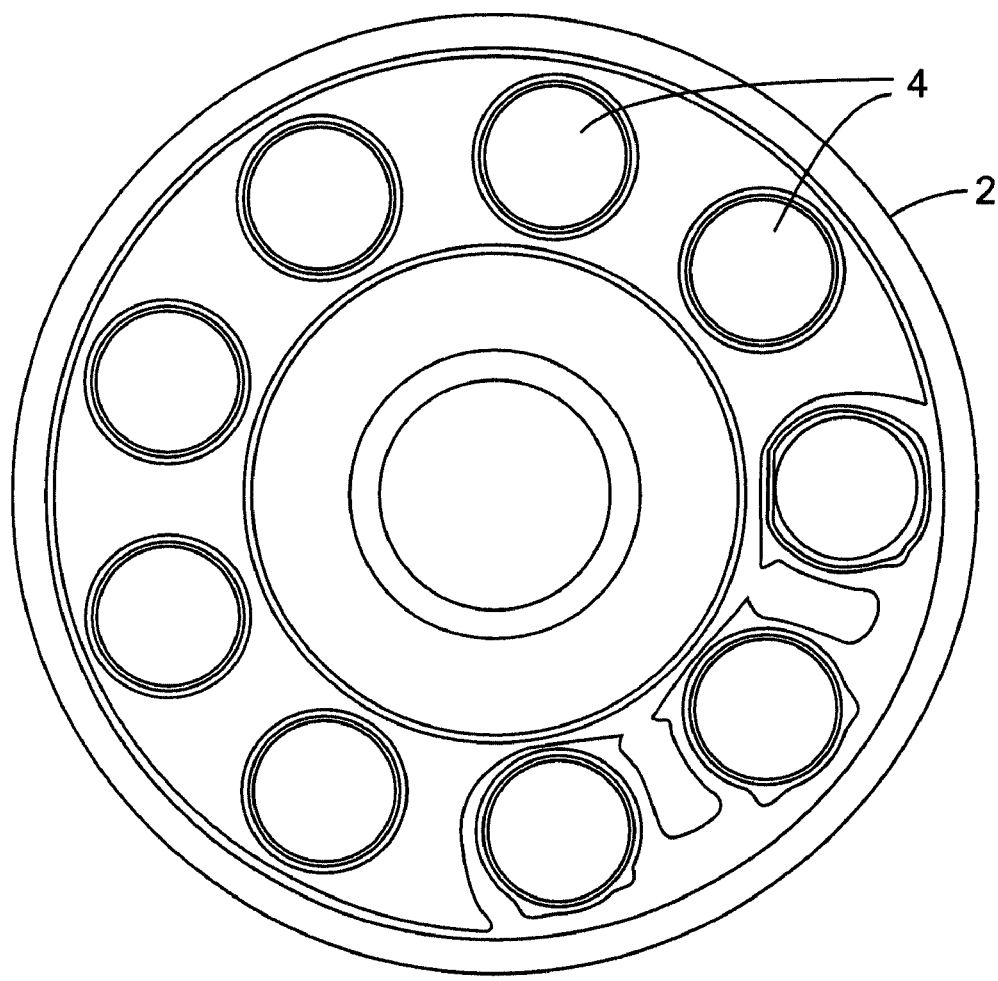
FIG. 4 shows the FEA calculated pressure distribution at 60° C. for the seal side surface of the feed stator of FIG. 2a and of the Examples.

FIG. 4 qualitatively shows the calculated (using finite element analysis) pressure distribution at 60° C. for the seal side surface (FIG. 2a) of the stator in the large inventive feed valve stator. In FIG. 4, the darkest shading represents the highest contact pressure. The lightest shading represents intermediate contact pressure and primarily surrounds those ports in the area at 3-6 o'clock in FIG. 4. The ports in this area are attached to the feed and thus experience more force blowing the seal apart. The intermediate shading represents the lightest contact pressure (primarily surrounding the centre feed port and on the outside perimeter of the valve). The analysis shows almost full, uniform contact of the seal even at this elevated temperature.

Actual testing of the reduced size, inventive feed valve described above has shown that heating, wear, and torque remain at an acceptable level with this higher average contact pressure.

The present application has been described with reference to examples of preferred embodiments. It will be apparent to those of ordinary skill in the art that changes and modifications may be made without departing from this invention.

What is claimed is:

1. A rotary valve, comprising:
a stator comprising at least two ports centred on a port pitch circle, and each port providing an opening over an open arc length around the port pitch circle and thereby defining port spacings between the ports over closed arc lengths around the port pitch circle, wherein the minimum closed arc length of a port spacing is less than the maximum open arc length of a port opening
a rotor rotating about a rotor axis at the centre of the port pitch circle and comprising at least two ports centred on the port pitch circle;
variable loading means to sealingly engage the rotor to the stator;
fixed loading means to sealingly engage the rotor to the stator; and
drive means to rotate the rotor about the rotor axis relative to the stator such that the ports in the rotor come into and out of alignment with the ports in the stator.

2. The rotary valve of claim 1 wherein the stator comprises a plurality of ports.

3. The rotary valve of claim 1 wherein the ports in the stator are circular.

4. The rotary valve of claim 1 wherein the ports in the stator are essentially the same size.

5. The rotary valve of claim 4 wherein the ports in the stator are spaced equidistant around the port pitch circle and thereby all the closed arc lengths of the port spacings are essentially equal and all the open arc lengths of the ports are essentially equal.

6. The rotary valve of claim 5 wherein the closed arc length of the port spacings is less than the open arc length of the port openings.

7. The rotary valve of claim 1 wherein the variable loading means comprises pistons located adjacent each port in the stator for providing a variable load to the stator in accordance with as pressure received at that port.

8. The rotary valve of claim 7 wherein the pistons are centred on the port pitch circle.

9. The rotary valve of claim 7 wherein the fixed loading means comprises springs for providing a fixed load to the stator and the springs are located outside the pistons.

10. The rotary valve of claim 9 wherein a first set of springs is located on a first spring pitch circle larger than the port pitch circle.

11. The rotary valve of claim 10 wherein a second set of springs is located on a second spring pitch circle smaller than the port pitch circle.

12. The rotary valve of claim 11 wherein the second set of springs applies less force than the first set of springs to sealingly engage the rotor to the stator.

13. The rotary valve of claim 12 wherein the spring constant of the second set of springs is smaller than that of the first set of springs.

14. The rotary valve of claim 1 wherein the fixed loading means comprises springs for providing a fixed load to the stator.

15. A rotary pressure swing device comprising the rotary valve of claim 1.

16. A rotary pressure swing adsorption device comprising the rotary valve of claim 1.

17. The rotary pressure swing adsorption device of claim 16 wherein the rotary valve is at the feed end of the device.

18. The rotary pressure swing adsorption device of claim 16 wherein the variable loading means comprises pistons located adjacent each port in the stator for providing a variable load to the stator in accordance with gas pressure received at that port from an adsorbent bed in the device; and
the fixed loading means comprises springs for providing a fixed load to the stator.

19. The rotary pressure swing adsorption device of claim 18 wherein the average contact pressure between the rotor and the stator during operation is greater than 59 psi.

20. The rotary pressure swing adsorption device of claim 18 wherein the springs provide more than 10% of the total loading force applied to the stator by the pistons and the springs during operation.

* * * * *